(12) United States Patent
Zhu et al.

(10) Patent No.: US 12,014,534 B2
(45) Date of Patent: Jun. 18, 2024

(54) PRINTED PHYSICAL UNCLONABLE FUNCTION PATTERNS

(71) Applicants: Xerox Corporation, Norwalk, CT (US); Palo Alto Research Center Incorporated, Palo Alto, CA (US)

(72) Inventors: Yujie Zhu, Mississauga (CA); Warren Jackson, San Francisco, CA (US); Ethan Shen, Toronto (CA); Biby Esther Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 537 days.

(21) Appl. No.: 17/227,685

(22) Filed: Apr. 12, 2021

(65) Prior Publication Data

US 2022/0324243 A1    Oct. 13, 2022

(51) Int. Cl.
| | | |
|---|---|---|
| *G06V 10/75* | (2022.01) | |
| *G06F 18/00* | (2023.01) | |
| *G06K 1/12* | (2006.01) | |
| *G06K 19/06* | (2006.01) | |
| *H04L 9/32* | (2006.01) | |

(52) U.S. Cl.
CPC ............ *G06V 10/757* (2022.01); *G06F 18/00* (2023.01); *G06K 1/121* (2013.01); *G06K 19/06028* (2013.01); *G06K 19/06037* (2013.01); *G06V 10/751* (2022.01); *H04L 9/3278* (2013.01)

(58) Field of Classification Search
CPC ........ B41M 3/14; B42D 25/346; B42D 25/36; B42D 25/378; G06F 18/00; G06K 1/121; G06K 19/06028; G06K 19/06037; G06V 10/751; G06V 10/757; H04L 9/3278
See application file for complete search history.

(56) References Cited

U.S. PATENT DOCUMENTS

| | | | |
|---|---|---|---|
| 7,785,098 B1 * | 8/2010 | Appleby | .............. G21K 1/02 |
| | | | 264/319 |
| 8,180,174 B2 | 5/2012 | Di Venuto et al. | |
| 9,206,309 B2 * | 12/2015 | Appleby | ............. B29C 33/3835 |
| 10,401,876 B1 * | 9/2019 | Coleman | .................. G05D 7/00 |
| 11,092,977 B1 * | 8/2021 | Coleman | .................. G02B 3/12 |
| 2009/0161312 A1 * | 6/2009 | Spearing | ............ H05K 7/20781 |
| | | | 361/679.53 |
| 2011/0122596 A1 * | 5/2011 | Miyazaki | ............. H05K 9/0096 |
| | | | 361/818 |
| 2011/0316764 A1 * | 12/2011 | Parry-Jones | ......... G02B 26/005 |
| | | | 345/60 |

(Continued)

FOREIGN PATENT DOCUMENTS

| | | |
|---|---|---|
| DE | 112011103162 B4 | 1/2016 |
| WO | 2011/006640 A2 | 1/2011 |
| WO | 2016177253 A1 | 11/2016 |

OTHER PUBLICATIONS

The Extended European Search Report mailed in Corresponding EP Application No. 22163895.0-1014 dated Aug. 23, 2022, 5 pages.

*Primary Examiner* — Thien M Le

(57) ABSTRACT

A method is disclosed. For example, the method includes applying a clear coat layer on a substrate, drying the clear coat layer to form random microstructures in the clear coat layer, dispensing a printing fluid to print a graphical pattern on the clear coat layer, and generating a physical unclonable function (PUF) pattern by drying the printing fluid that fills the random microstructures formed in the clear coat layer.

17 Claims, 7 Drawing Sheets

(56) References Cited

U.S. PATENT DOCUMENTS

| | | | |
|---|---|---|---|
| 2012/0315082 A1* | 12/2012 | Linzell | B23K 20/021 |
| | | | 264/249 |
| 2015/0175814 A1* | 6/2015 | Aizenberg | C09D 5/1693 |
| | | | 427/2.24 |
| 2019/0280561 A1* | 9/2019 | Abramov | H02K 7/183 |
| 2020/0082235 A1 | 3/2020 | Gupta et al. | |
| 2020/0412555 A1 | 12/2020 | Chandra et al. | |

* cited by examiner

PRINTED PHYSICAL UNCLONABLE FUNCTION PATTERNS

The present disclosure relates generally to anti-counterfeiting, and relates more particularly to a method and apparatus to print physical unclonable function patterns.

BACKGROUND

Physical unclonable functions (PUFs) are unique random physical patterns that can be used for anti-counterfeiting. PUFs can be very difficult and costly to duplicate and may be fabricated by a stochastic process that affords a large number of robust tags. The PUF patterns can be designed to be readable with appropriate analytical tools. The PUF patterns can be recorded and stored for verification. A PUF can be used to prevent counterfeiting, prevent substitution of parts in an assembly, ensure proper custodianship, serve as an uncopiable digital signature, and the like.

Current methods to generate PUFs can be expensive to produce and not economically viable for wide use. Some examples of these expensive methods may include PUFs that are integrated with unique markers that carry a special optical signature (e.g., absorption or luminescence at a certain wavelength or combination of wavelengths), or creation of a random distribution of nanostructures (e.g., nanoparticles, quantum dots, or self-assembly molecules). In addition, detection of these types of PUFs may require specialized analytical equipment, which is not easily accessible to distributors and end-users.

SUMMARY

According to aspects illustrated herein, there are provided a method and a non-transitory computer readable medium for printing a physical unclonable function (PUF). One disclosed feature of the embodiments is a method that comprises applying a clear coat layer on a substrate, drying the clear coat layer to form random microstructures in the clear coat layer, dispensing a printing fluid to print a graphical pattern on the clear coat layer, and generating a physical unclonable function (PUF) pattern by drying the printing fluid that fills the random microstructures formed in the clear coat layer.

Another disclosed feature of the embodiments is a non-transitory computer-readable medium having stored thereon a plurality of instructions, the plurality of instructions including instructions which, when executed by a processor, cause the processor to perform operations to apply a clear coat layer on a substrate, dry the clear coat layer to form random microstructures in the clear coat layer, dispense a printing fluid to print a graphical pattern on the clear coat layer, and generate a physical unclonable function (PUF) pattern by drying the printing fluid that fills the random microstructures formed in the clear coat layer.

Another disclosed feature is a method for authenticating a PUF that is printed. The method comprises capturing an image of a printed physical unclonable function (PUF) on a substrate with a camera on a mobile device, wherein the PUF is formed on the substrate with printing fluid dispensed on a clear coat that is dried to form random microstructures that are filled in by the printing fluid, comparing the image to an image stored on a server, and authenticating the substrate when the image of the PUF matches the image stored on the server.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to print physical unclonable function (PUF) patterns. As discussed above, current methods to generate PUFs can be expensive to produce and not economically viable for wide use. Some examples of these expensive methods may include PUFs that are integrated with unique markers that carry a special optical signature (e.g., absorption or luminescence at a certain wavelength or combination of wavelengths), or creation of a random distribution of nanostructures (e.g., nanoparticles, quantum dots, or self-assembly molecules). In addition, detection of these types of PUFs may require specialized analytical equipment, which is not easily accessible to distributors and end-users.

Some lower cost methods that use printing are available. For example, an ink edge anti-counterfeiting method was developed where blowing and pressing after printing was used to create random structures on the ink edges. However, printing only with ink by itself creates a low resolution that is easier to duplicate, which diminishes the security of the PUF.

Embodiments of the present disclosure provide a printable PUF that is low cost while providing a high resolution that makes it difficult to duplicate. In one embodiment, a primary clear coat may be applied to a substrate. The clear coat may be dried to form random cracks in the coat on the substrate. Ink may be dispensed onto the dried primary clear coat. The ink may fill in the random cracks that are formed in the coat to generate the PUFs.

The PUFs of the present disclosure may also be authenticated using widely available equipment. For example, a camera on a cellphone or mobile device may be used to capture an image of the PUF for authentication. Thus, no special equipment is needed for authenticating the printed PUFs of the present disclosure.

Figure 1:
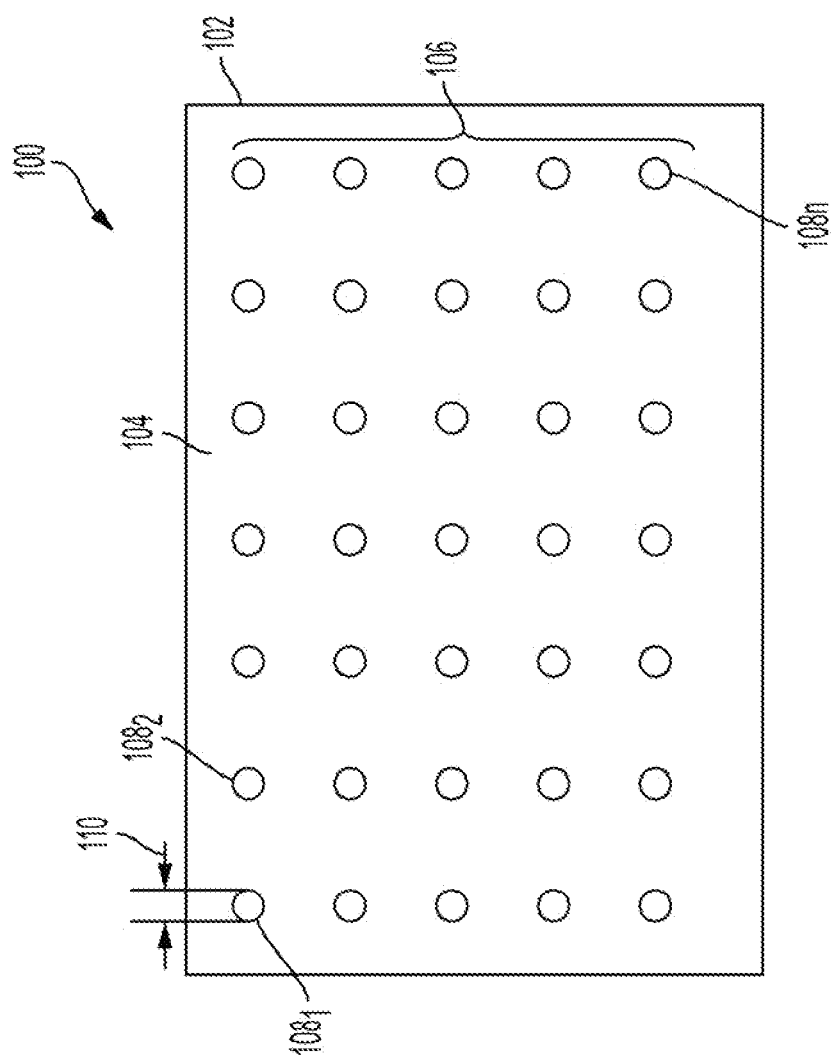
FIG. 1 illustrates a block diagram of an example PUF of the present disclosure.

FIG. 1 illustrates an example document 100 that includes a physical unclonable function (PUF) 108 that is generated via a printing process of the present disclosure. In one embodiment, although the PUF 108 is illustrated as being printed on the document 100, the PUF 108 may be printed on any surface, including a packaging, a part, a surface of a device or housing, and the like.

In one embodiment, the document 100 may include a substrate 102. The substrate 102 may be paper, cardboard, plastic, or any other type of surface that can receive a clear coat layer 104 and printing fluid used to print a pattern 106. In one embodiment, the clear coat layer 104 may include a colloidal mixture of a fluid and solid particulates. For example, the fluid may be a solvent or water. The solid particulates may include silica or other types of polymers. In one embodiment, the clear coat layer 104 may also use nanoparticle colloidal mixtures, sol-gel solutions, polymer solutions, polymer blends, and the like.

In one embodiment, the clear coat layer 104 may be a commercially available colloidal mixture of water and silica containing between 30 weight percent to 50 weight percent silica. In one embodiment, the clear coat layer 104 may include 34 weight percent silica. In one embodiment, the clear coat layer 104 may include 50 weight percent silica.

In one embodiment, a printing fluid may be dispensed over the clear coat layer 104 to form the pattern 106 of the PUFs $108_1$ to $108_n$ (hereinafter also referred to individually as a PUF 108 or collectively as PUFs 108). Although the pattern 106 of PUFs 108 is illustrated as a series of dots, it should be noted that any pattern 106 may be printed. For example, the pattern 106 may be a bar code, a quick response (QR) code, or a pattern of different shapes (e.g., square, rectangles, ovals, irregular shapes, and the like).

In one embodiment, any type of clear coat layer 104 may be used that can adhere to the substrate 102. In one embodiment, any type of printing fluid may be used that is compatible with the clear coat layer 104. In other words, the printing fluid should be able to adhere to and dry on the clear coat layer 104 to generate the pattern 106.

In one embodiment, the PUFs 108 may be printed to have a width or diameter 110 as small as 50 microns. Thus, the present methods may be used to print PUFs 108 that are relatively small that can use commercially available compounds. In addition, the PUFs 108 may be analyzed or authenticated using widely available equipment (e.g., cameras on mobile phones). Thus, the methods of the present disclosure provide PUFs 108 that are difficult to counterfeit, while maintaining a relatively low cost to print the PUFs 108.

Figure 2:
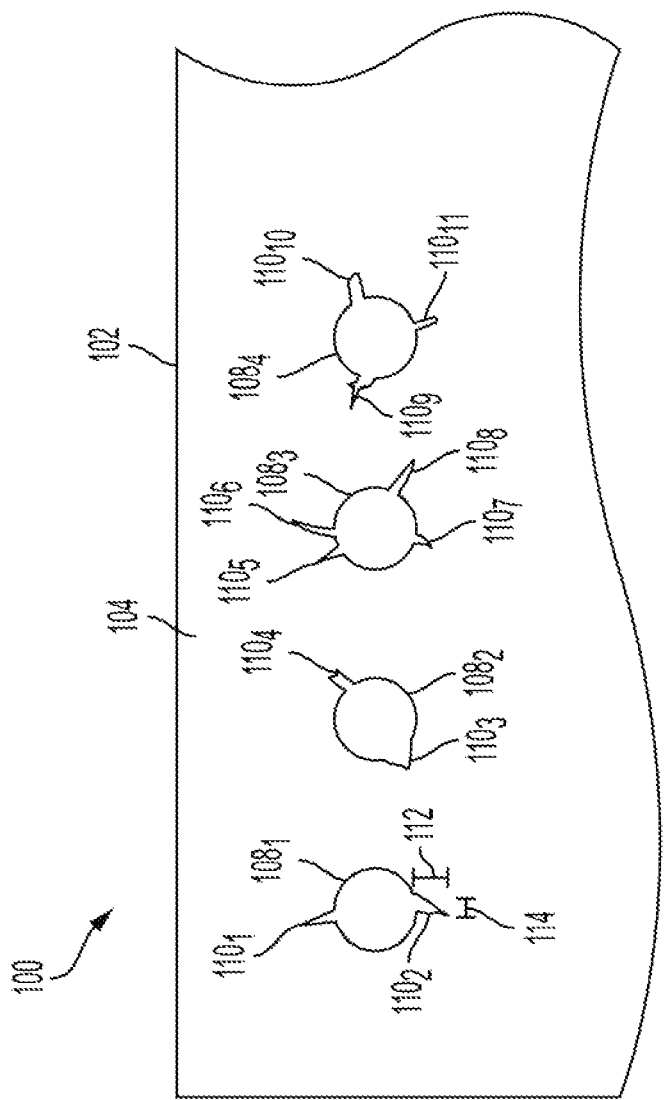
FIG. 2 illustrates a close up of the PUF of the present disclosure.

FIG. 2 illustrates a close up view of the example PUFs 108. In one embodiment, the clear coat layer 104 may be dispensed and dried to form random microstructures $110_1$ to $110_{11}$ (hereinafter referred to individually as a random microstructure 110 or collectively as microstructures 110). The random microstructures 110 may be cracks that are formed in the clear coat layer 104 from drying.

In one embodiment, the resolution of the cracks or random microstructures 110 may be controlled by a thickness of the clear coat layer 104. For example, if the resolution is too high (e.g., a smaller number of large sized microstructures 110), the random microstructures 110 may be too easily copied via a printing process alone. If the resolution is too low (e.g., a large number of smaller sized microstructures 110), the random microstructures 110 may be too small to be analyzed with an image captured from a standard red, green, blue (RGB) camera on a mobile device (e.g., a camera on a mobile phone).

In one embodiment, the thickness of the clear coat layer 104 may be controlled by an amount of the clear coat layer 104 that is dispensed via a printhead of a printer. In one embodiment, the thickness of the clear coat layer 104 may be controlled by a spin rate of a spin coating process. For example, the clear coat layer 104 may be spun on to the substrate 102 at between 100 rotations per minute (RPM) to 5000 RPM. In one embodiment, the clear coat layer 104 may be spun on to the substrate 102 at between 500 RPM to 3,000 RPM.

Although a spin coating process is described above, it should be noted that other coating methods may be used. For example, the clear coat layer 104 may be applied using a drawdown coating method, aerosol spraying, and the like.

In one embodiment, the resolution of the random microstructures 110 may be such that the random microstructures 110 have a length 112 and a width 114 of several hundred microns. In one embodiment, the random microstructures 100 may have a length 112 of between 20 to 70 microns and a width 114 of between 3 to 9 microns. In one embodiment, the thickness of the clear coat layer 104 to achieve the desired resolution of the random microstructures 110 may be approximately 5 nanometers (nm) to 100 nm for nanoparticle colloidal coatings described above. The thickness may vary for other types of materials. For example, the thickness of the clear coat layer 104 may be 5 nm to 10 microns for polymer coatings.

In one embodiment, the printing fluid may be dispensed on the clear coat layer 104, as described above. The printing fluid may fill into the random microstructures 110 formed in the clear coat layer 104. The image formed by the combination of the printing fluid in the random microstructures 110 and on a particular location of the clear coat layer 104 may form the PUF 108. In other words, in the example illustrated in FIG. 2, the PUF $108_1$ may include the printed dot and the random microstructures $110_1$ and $110_2$ that are filled with the printing fluid.

The PUF $108_2$ may be different from the PUF $108_1$ as the arrangement and sizes of the random microstructures $110_3$ and $110_4$ may be different from arrangement and sizes of the random microstructures $110_1$ and $110_2$ of the PUF $108_1$. The PUF $108_3$ and the PUF $108_4$ may also have a unique arrangement, number, and size of random microstructures $110_5$-$110_8$ and $110_8$-$110_{11}$, respectively. In other words, each PUF 108 in the pattern 106 may be unique or different due to the random microstructures 110 that are generated at different locations along the surface of the clear coat layer 104.

Figure 3:
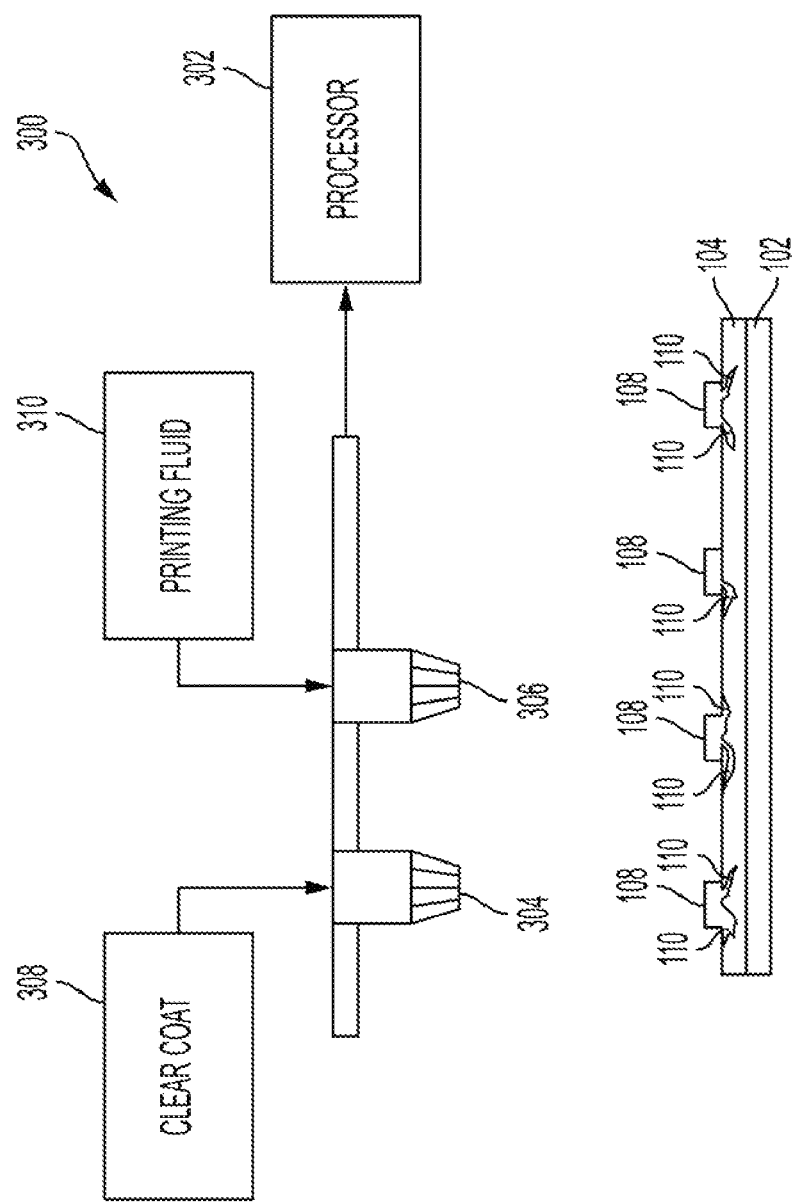
FIG. 3 illustrates a block diagram of an example apparatus to generate the PUF of the present disclosure.

FIG. 3 illustrates an example apparatus 300 that may be used to print the PUFs 108 of the present disclosure. In one embodiment, the apparatus 300 may be a printer that includes multiple printheads 304 and 306. The printheads 304 and 306 may be used to dispense different fluids. For example, a storage container 308 may store clear coat that is dispensed via the printhead 304. A storage container 310 may store printing fluid that is dispensed via the printhead 306.

In one embodiment, a processor 302 may be communicatively coupled to the printheads 304 and 306 to control dispensing of the clear coat and the printing fluid. In one embodiment, the substrate 102 may be passed below the printheads 304 and 306 or the printheads 304 and 306 may be moved over the substrate 102.

In one embodiment, the processor 302 may control the printhead 304 to dispense the clear coat to form the clear coat layer 104 on the substrate 102. The clear coat may be dispensed to form a desired thickness of the clear coat layer 104, as described above. The printhead 304 may make multiple passes over the substrate 102 to dispense the clear coat.

The substrate 102 with the clear coat layer 104 may be moved to a drying apparatus, oven, or air dried to dry the clear coat layer 104. Drying the clear coat layer 104 may generate the random microstructures 110 in the clear coat layer 104.

The substrate 102 may be placed below the printheads 304 and 306 after the clear coat layer 104 is dried. The processor 302 may then control the printhead 306 to dispense the print fluid to print the pattern 106 on the clear coat layer 104. The printing fluid may fill the random microstructures 110 around the locations where the printing fluid is dispensed. The printing fluid may then be dried to form the PUFs 108.

It should be noted that the apparatus 300 has been simplified for ease of explanation and may include additional components which are not shown. For example, the apparatus 300 may include a motor to move the printheads 304 and 306, a memory to store instructions, a power supply, other electrical components, and the like.

Although FIG. 3 illustrates printing the PUFs 108 with a single printer or apparatus 300, it should be noted that different devices may be used to print the PUFs 108. For example, the clear coat layer 104 may be spin coated onto the substrate 102 via a spin coater. In addition, ovens may be used to dry the clear coat layer 104 and the printing fluid that is dispensed.

Examples 1-3 below provide examples with process parameters for printing the PUFs 108 of the present disclosure.

Example 1

A colloidal silica solution of 34 weight percent suspended in deionized water was obtained to form the clear coat layer 104. The colloidal silica solution was applied to a paper board substrate by spin coating at 500 RPM for 1 minute. The clear coat layer 104 was dried in an oven at 60 degrees Celsius (° C.) for 1 hour. An aqueous graphical ink was used to print a pattern on the dried clear coat layer 104. A Dimatix DMP2800 printer was used to dispense the ink to produce a 600×600 dots per inch (dpi) pattern with the following conditions: drop mass=4.5 to 4.8 nanograms (ng), drop velocity=6-7 meters per second, frequency=5 kilohertz, printhead temperature=ambient to 40° C., and voltage=16-20 volts. The ink was dried in an oven at 120° C.+ for 10 minutes.

Example 2

A colloidal silica solution of 34 weight percent suspended in deionized water was obtained to form the clear coat layer 104. The colloidal silica solution was applied to a paper board substrate by spin coating at 3000 RPM for 1 minute. The clear coat layer 104 was dried in an oven at 60 degrees Celsius (° C.) for 1 hour. An aqueous graphical ink was used to print a pattern on the dried clear coat layer 104. A Dimatix DMP2800 printer was used to dispense the ink to produce a 600×600 dots per inch (dpi) pattern with the following conditions: drop mass=4.5 to 4.8 nanograms (ng), drop velocity=6-7 meters per second, frequency=5 kilohertz, printhead temperature=ambient to 40° C., and voltage=16-20 volts. The ink was dried in an oven at 120° C.+ for 10 minutes.

Example 3

A colloidal silica solution of 50 weight percent suspended in deionized water was obtained to form the clear coat layer 104. The colloidal silica solution was applied to a paper board substrate by spin coating at 500 RPM for 1 minute. The clear coat layer 104 was dried in an oven at 60 degrees Celsius (° C.) for 1 hour. An aqueous graphical ink was used to print a pattern on the dried clear coat layer 104. A Dimatix DMP2800 printer was used to dispense the ink to produce a 600×600 dots per inch (dpi) pattern with the following conditions: drop mass=4.5 to 4.8 nanograms (ng), drop velocity=6-7 meters per second, frequency=5 kilohertz, printhead temperature=ambient to 40° C., and voltage=16-20 volts. The ink was dried in an oven at 120° C. for 10 minutes.

The above examples were found to form PUFs 108 with a desired resolution. The random microstructures 110 in the clear coat layer 104 were measured to have a width of between 3-9 microns and a length of 20-70 microns.

Figure 4:
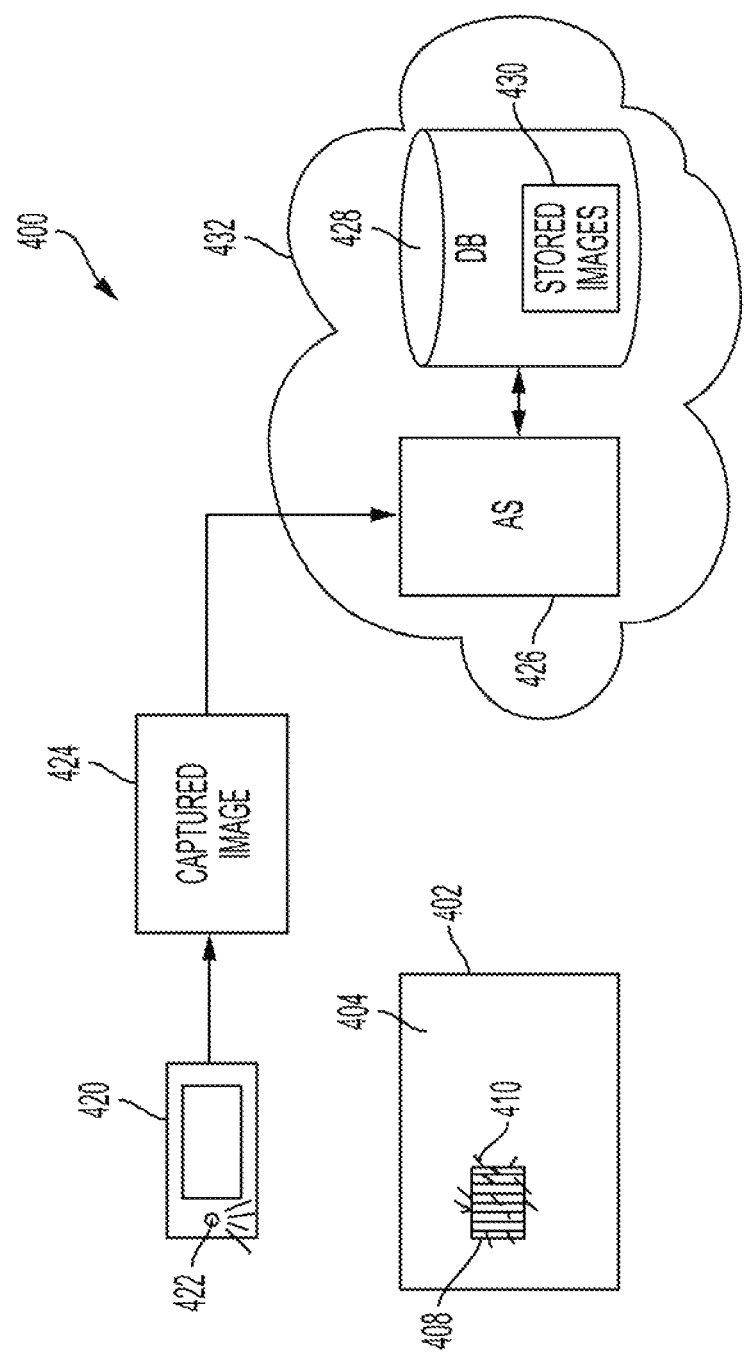
FIG. 4 illustrates a block diagram of an example system to authenticate the PUF of the present disclosure.

FIG. 4 illustrates a block diagram of a system 400 that is used to authenticate the PUFs 108 of the present disclosure. As noted above, the printed PUFs 108 may allow available devices to be used to authenticate the PUFs 108. In other words, expensive specialized equipment is not needed to authenticate the PUFs 108 of the present disclosure.

In one embodiment, the system 400 may include a mobile device 420 that includes a camera 422. The mobile device 420 may be a cellphone, mobile telephone, a smart phone, a tablet, a laptop computer, and the like. In other words, any device with an image capturing device may be used to capture an image.

An end user may receive a document printed on the substrate 402 and want to authenticate the document. The end user may capture an image 424 of a PUF 408 printed on a substrate 402. The PUF 408 may be printed or formed similar to the ways the PUF 108 may be printed or formed, as described above.

In FIG. 4, the PUF 408 is illustrated as a barcode. As noted above, the PUF 408 may be any pattern (e.g., a barcode, a QR code, a pattern of shapes, and the like). The PUF 408 may include a variety of random microstructures 410 located at different locations and different lines of the barcode. The PUF 408 may be formed by dispensing printing fluid or ink on a dried clear coat layer 404 to fill the random microstructures 410 with the printing fluid.

In one embodiment, images may be captured of the PUF 408 after being printed during production. The images may be saved in a database (DB) 428 of a network 432 as stored images 430. The network 432 may be an internet protocol (IP) network.

To authenticate the document printed on the substrate 402, the mobile device 420 may transmit the captured image 424 to an application server (AS) 426 via the network 432. The AS 426 may access stored images 430 in the DB 428. The AS 426 may compare the captured image 424 to the stored images 430. If a match is found, the AS 426 may transmit a notification to the mobile device 420 that the document has been authenticated. If no match is found, the AS 426 may transmit a notification to the mobile device 420 that the document is not authentic. Thus, the printed PUF 408 may allow widely available equipment that is relatively inexpensive to be used to authenticate the printed PUF 408 of the present disclosure.

Figure 5:
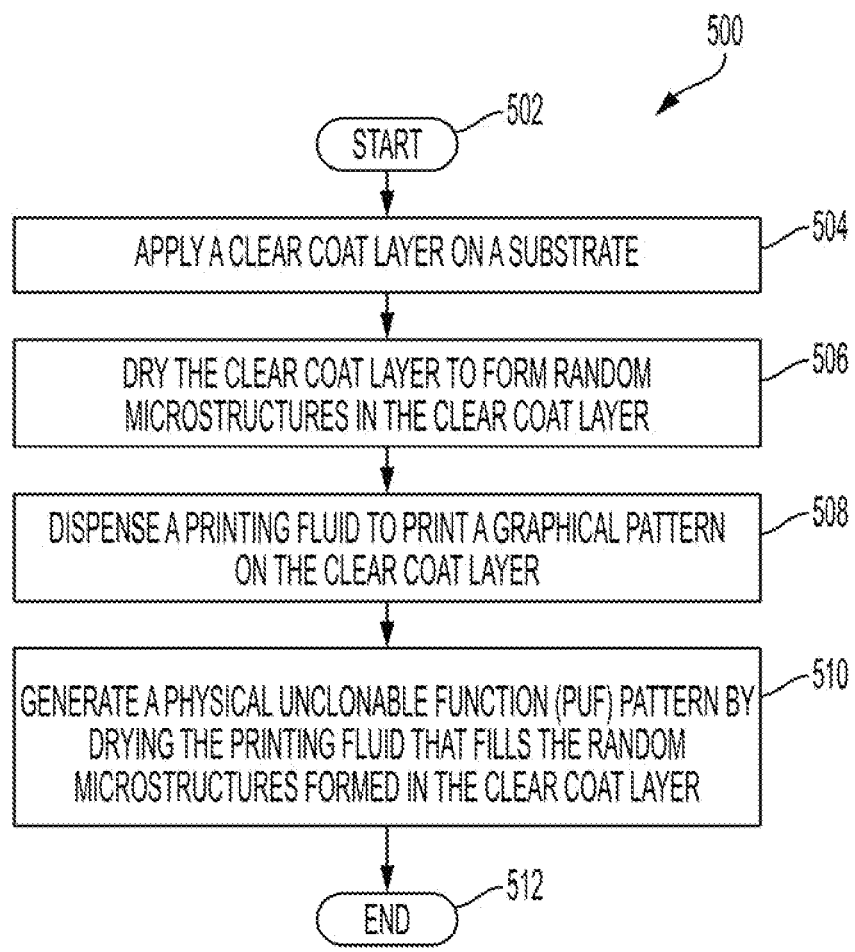
FIG. 5 illustrates a flow chart of a method for printing a PUF of the present disclosure.

FIG. 5 illustrates a flow chart of an example method 500 for printing a PUF of the present disclosure. In one embodiment, the method 500 may be performed by the apparatus 300 or by an apparatus such as the apparatus 700 illustrated in FIG. 7 and discussed below.

In one embodiment, the method 500 begins at block 502. At block 504, the method 500 applies a clear coat layer on a substrate. The clear coat layer may be any type of colloidal suspension of solid particulates that is compatible with the substrate. For example, the colloidal suspension should be able to adhere to the substrate. An example of the colloidal suspension may include silica particles suspended in deionized water.

In one embodiment, the clear coat layer may be applied via a spin coating process, a drawdown coating method, aerosol spraying, and the like. In one embodiment, the clear coat layer may be applied via a printer. The clear coat layer may be applied to a desired thickness to obtain a desired resolution of microstructures that are formed in the clear coat layer, as described below.

At block 506, the method 500 dries the clear coat layer to form random microstructures in the clear coat layer. The random microstructures may include micro cracks that are formed in the clear coat layer as the clear coat layer is dried. The random microstructures may have a different shapes, arrangement and sizes. An example desired resolution of the random microstructures may include microstructures that have a width of between 3 to 9 microns and a length of between 20 to 70 microns.

At block 508, the method 500 dispenses a printing fluid to print a graphical pattern on the clear coat layer. The printing fluid may be an aqueous graphical ink. Any type of ink may be used that is compatible with the clear coat layer and can adhere to the clear coat layer to print a desired pattern of PUFs. The printing fluid may fill into the random microstructures around the locations where the printing fluid is dispensed onto the clear coat layer.

At block 510, the method 500 generates a physical unclonable function (PUF) pattern by drying the printing fluid that fills the random microstructures formed in the clear coat layer. For example, the printing fluid may be dried, and the resulting image of the printing fluid that is dispensed and the printing fluid in the random microstructures may form the PUF pattern. At block 512, the method 500 ends.

Figure 6:
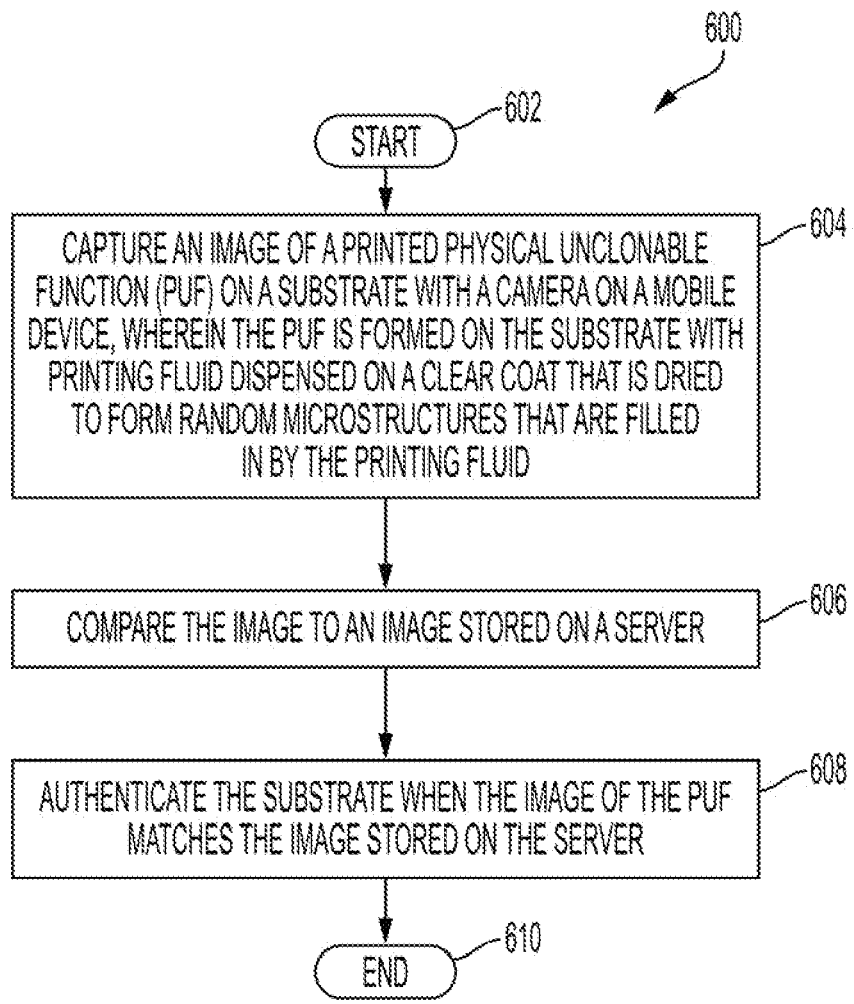
FIG. 6 illustrates a flow chart of a method for authenticating a PUF that is printed of the present disclosure.

FIG. 6 illustrates a flow chart of an example method 600 for authenticating a PUF that is printed of the present disclosure. In one embodiment, the method 600 may be performed by the system 400 or by an apparatus such as the apparatus 700 illustrated in FIG. 7 and discussed below.

In one embodiment, the method 600 begins at block 602. At block 604, the method 600 captures an image of a printed physical unclonable function (PUF) on a substrate with a camera on a mobile device, wherein the PUF is formed on the substrate with printing fluid dispensed on a clear coat that is dried to form random microstructures that are filled in by the printing fluid. In one embodiment, the mobile device may be a cell phone, a mobile phone, a smart phone, a tablet computer, a laptop computer and the like. In other words, any type of device that has a camera may be used to capture an image of the PUF for authentication.

The printed PUF may be formed via random microstructures formed in the clear coat layer that is dispensed on the substrate. The printing fluid may be dispensed on the clear coat and may fill the random microstructures in the clear coat layer. The resolution of the PUFs may be controlled via the material used for the clear coat and a thickness of the clear coat layer, as described above.

At block 606, the method 600 compares the image to an image stored on a server. For example, an image of the printed PUF may be captured when the PUF is formed. The image may be stored in a database in a network. The database may be managed by an authentication service or a company that printed the PUF. The image captured by the mobile device may be compared to the stored images in the database to determine if a match is found.

At block 608, the method 600 authenticates the substrate when the image of the PUF matches the image stored on the server. When a match is found, the substrate may be authenticated. For example, the mobile device that captured the image of the printed PUF may receive a message or notification that the substrate has been authenticated. At block 610, the method 600 ends.

Figure 7:
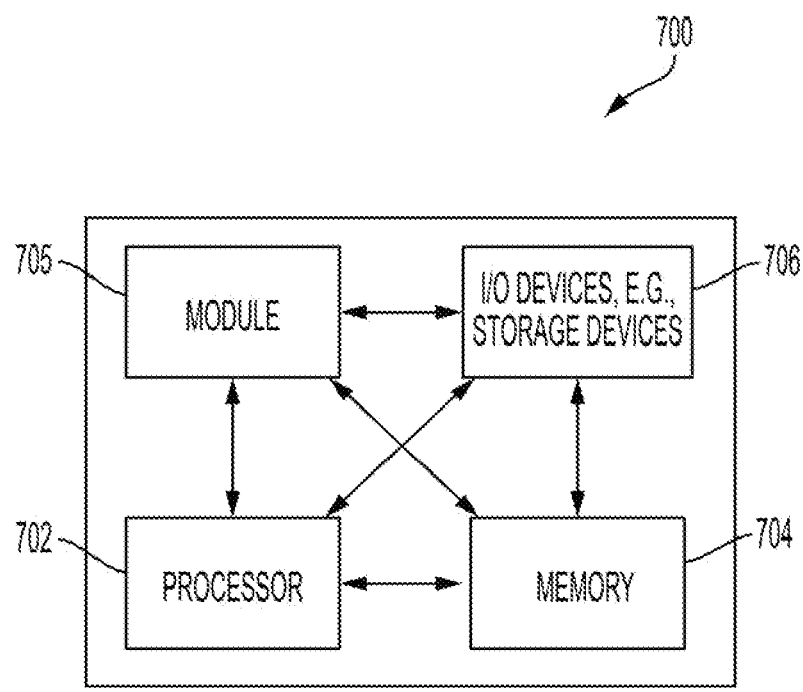
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for printing a PUF, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for printing a PUF (e.g., a software program comprising computer-executable instructions) can be loaded into memory 704 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for printing a PUF (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
 applying a clear coat layer on a substrate;
 drying the clear coat layer to form random microstructures in the clear coat layer;
 dispensing a printing fluid to print a graphical pattern on the clear coat layer, wherein the graphical pattern comprises a bar code, a quick response code, or a pattern of shapes; and
 generating a physical unclonable function (PUF) pattern by drying the printing fluid that fills the random microstructures formed in the clear coat layer.

2. The method of claim 1, wherein the clear coat layer comprises a colloidal mixture of water and solid particulates.

3. The method of claim 2, wherein the solid particulates comprise silica in a range of 30 weight percent to 50 weight percent.

4. The method of claim 1, wherein the applying comprises:
 dispensing the clear coat layer using a printhead of a printing apparatus that also dispenses the printing fluid.

5. The method of claim 1, wherein the applying is performed via a spin coating procedure at between 100 rotations per minute (RPM) to 5000 RPM.

6. The method of claim 1, wherein the clear coat layer is applied to a desired thickness to form the random microstructures at a desired resolution.

7. The method of claim 6, wherein the desired thickness comprises 5 nanometers (nm) to 100 nm.

8. The method of claim 1, wherein the printing fluid comprises an aqueous graphical ink.

9. A non-transitory computer-readable medium storing a plurality of instructions, which when executed by a processor, causes the processor to perform operations, comprising:
 applying a clear coat layer on a substrate;
 drying the clear coat layer to form random microstructures in the clear coat layer;
 dispensing a printing fluid to print a graphical pattern on the clear coat layer, wherein the graphical pattern comprises a bar code, a quick response code, or a pattern of shapes; and
 generating a physical unclonable function (PUF) pattern by drying the printing fluid that fills the random microstructures formed in the clear coat layer.

10. The non-transitory computer-readable medium of claim 9, wherein the clear coat layer comprises a colloidal mixture of water and solid particulates.

11. The non-transitory computer-readable medium of claim 10, wherein the solid particulates comprise silica in a range of 30 weight percent to 50 weight percent.

12. The non-transitory computer-readable medium of claim 9, wherein the applying comprises:
 dispensing the clear coat layer using a printhead of a printing apparatus that also dispenses the printing fluid.

13. The non-transitory computer-readable medium of claim 9, wherein the applying is performed via a spin coating procedure at between 100 rotations per minute (RPM) to 5000 RPM.

14. The non-transitory computer-readable medium of claim 9, wherein the clear coat layer is applied to a desired thickness to form the random microstructures at a desired resolution.

15. The non-transitory computer-readable medium of claim 14, wherein the desired thickness comprises 5 nanometers (nm) to 100 nm.

16. The non-transitory computer-readable medium of claim 9, wherein the printing fluid comprises an aqueous graphical ink.

17. A method, comprising:
 capturing an image of a printed physical unclonable function (PUF) on a substrate with a camera on a mobile device, wherein the PUF is formed on the substrate with printing fluid dispensed on a clear coat that is dried to form random microstructures that are filled in by the printing fluid, wherein the clear coat comprises a colloidal mixture of water and silica in a range of 30 weight percent to 50 weight percent;
 comparing the image of the printed PUF to an image stored on a server; and
 authenticating the substrate when the image of the printed PUF matches the image stored on the server.

* * * * *